US009796242B2

(12) United States Patent
Mizutani et al.

(10) Patent No.: US 9,796,242 B2
(45) Date of Patent: Oct. 24, 2017

(54) AIR CONDITIONER FOR VEHICLE

(71) Applicant: DENSO CORPORATION, Kariya, Aichi-pref. (JP)

(72) Inventors: Masashi Mizutani, Kariya (JP); Koji Wakabayashi, Anjo (JP); Masashi Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 573 days.

(21) Appl. No.: 14/364,731

(22) PCT Filed: Dec. 14, 2012

(86) PCT No.: PCT/JP2012/007992
§ 371 (c)(1),
(2) Date: Jun. 12, 2014

(87) PCT Pub. No.: WO2013/088727
PCT Pub. Date: Jun. 20, 2013

(65) Prior Publication Data
US 2014/0373563 A1 Dec. 25, 2014

(30) Foreign Application Priority Data
Dec. 15, 2011 (JP) ................................. 2011-274953

(51) Int. Cl.
F25D 17/00 (2006.01)
B60H 1/00 (2006.01)
B60H 1/32 (2006.01)
F25D 17/04 (2006.01)

(52) U.S. Cl.
CPC ..... B60H 1/00735 (2013.01); B60H 1/00742 (2013.01); B60H 1/00807 (2013.01);
(Continued)

(58) Field of Classification Search
CPC .......... B60H 1/00735; B60H 1/00742
See application file for complete search history.

(56) References Cited

U.S. PATENT DOCUMENTS 4,771,610 A * 9/1988 Nakashima ............... F25B 5/00
62/160
5,301,515 A * 4/1994 Iritai .................. B60H 1/00392
454/121

(Continued)

FOREIGN PATENT DOCUMENTS

JP 1983067513 A 4/1983
JP 6255357 A 9/1994
(Continued)

OTHER PUBLICATIONS

Office Action mailed on Dec. 24, 2013 in the correspondence JP application No. 2011-274953 (in Japanese with English Translation).

(Continued)

Primary Examiner — Justin Jonaitis
Assistant Examiner — Kamran Tavakoldavani
(74) Attorney, Agent, or Firm — Harness, Dickey & Pierce, P.L.C.

(57) ABSTRACT

In an air conditioner for a vehicle, a flow speed of air flowing through a first ventilation part of an evaporator is faster than a flow speed of air flowing through a second ventilation part of the evaporator when an intensive air-conditioning operation for a driver seat is operated, with respect to a case where a normal air-conditioning operation is performed. In this case, a correct target evaporator temperature is calculated to be higher by a predetermined temperature than a target evaporator temperature, and a detected temperature detected by an evaporator sensor is approached to the correct target evaporator temperature. Therefore, it can restrict the second ventilation part from being frosted.

4 Claims, 8 Drawing Sheets

(52) U.S. Cl.
CPC ........... *B60H 1/00828* (2013.01); *B60H 1/32* (2013.01); *B60H 1/321* (2013.01); *F25D 17/04* (2013.01); *F25D 17/045* (2013.01)

(56) References Cited

U.S. PATENT DOCUMENTS

| | | | | |
|---|---|---|---|---|
| 5,983,652 | A | * 11/1999 | Iritani | B60H 1/00021 62/156 |
| 6,192,698 | B1 | * 2/2001 | Kakehashi | B60H 1/00064 165/203 |
| 6,293,339 | B1 | * 9/2001 | Uemura | B60H 1/00064 165/103 |
| 7,082,990 | B1 | 8/2006 | Uemura et al. | |

FOREIGN PATENT DOCUMENTS

| | | | |
|---|---|---|---|
| JP | 948234 | A | 2/1997 |
| JP | H10915 | A | 1/1998 |
| JP | 2000062437 | A | 2/2000 |
| JP | 2000085338 | A | 3/2000 |
| JP | 2009292293 | A | 12/2009 |
| JP | 2010221743 | A | 10/2010 |

OTHER PUBLICATIONS

International Search Report and Written Opinion (in Japanese with English Translation) for PCT/JP2012/007992, mailed Mar. 19, 2013; ISA/JP.

* cited by examiner

FIG. 7

TEO CORRECTING VALUE (α°C)

| OUTSIDE TEMPERATURE | BLOWING STATE | MODE | FACE MODE | | | B/L MODE | | | FOOT MODE | | |
|---|---|---|---|---|---|---|---|---|---|---|---|
| | | BLOWER | Hi | Me | Lo | Hi | Me | Lo | Hi | Me | Lo |
| 15°C | ALL SEATS (NORMAL BLOWING) | | 0 | 0 | 0 | 0 | 0 | 0 | 0 | 0 | 0 |
| | FRONT SEATS (Rr-CLOSED) | | 0 | 0 | 0 | 0 | 0 | 0 | 0 | 0 | 0 |
| | SINGLE SEAT (Rr AND PASSENGER SEAT IS CLOSED) | | +1.0 | +0.7 | +0.5 | +0.5 | +0.2 | 0 | 0 | +0.2 | +0.1 |
| 10°C | ALL SEATS (NORMAL BLOWING) | | 0 | 0 | 0 | 0 | 0 | 0 | 0 | 0 | 0 |
| | FRONT SEATS (Rr-CLOSED) | | 0 | 0 | 0 | 0 | 0 | 0 | 0 | 0 | 0 |
| | SINGLE SEAT (Rr AND PASSENGER SEAT IS CLOSED) | | +1.0 | +0.7 | +0.5 | +0.4 | +0.2 | 0 | 0 | +0.1 | 0 |
| 5°C | ALL SEATS (NORMAL BLOWING) | | 0 | 0 | 0 | 0 | 0 | 0 | 0 | 0 | 0 |
| | FRONT SEATS (Rr-CLOSED) | | 0 | 0 | 0 | 0 | 0 | 0 | 0 | 0 | 0 |
| | SINGLE SEAT (Rr AND PASSENGER SEAT IS CLOSED) | | +1.0 | +0.7 | +0.5 | +0.3 | +0.1 | 0 | 0 | 0 | 0 |

FIG. 8      (a) NORMAL AIR CONDITIONING
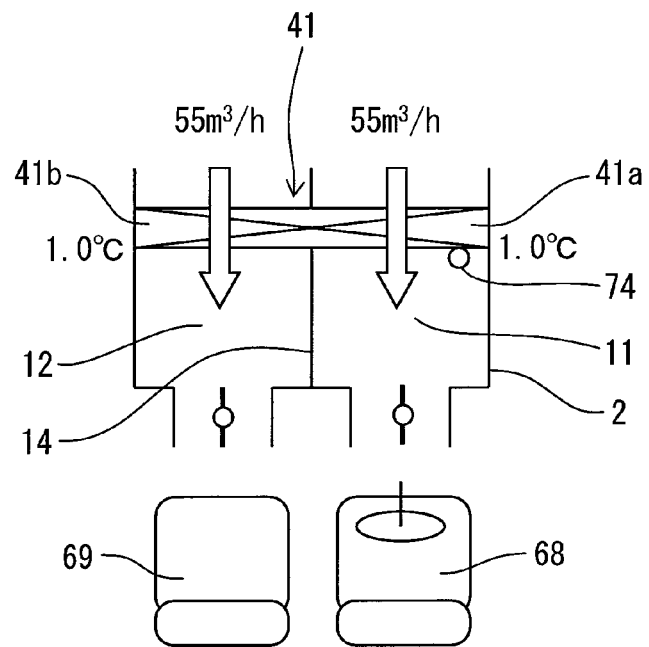
(b) INTENSIVE AIR CONDITIONING
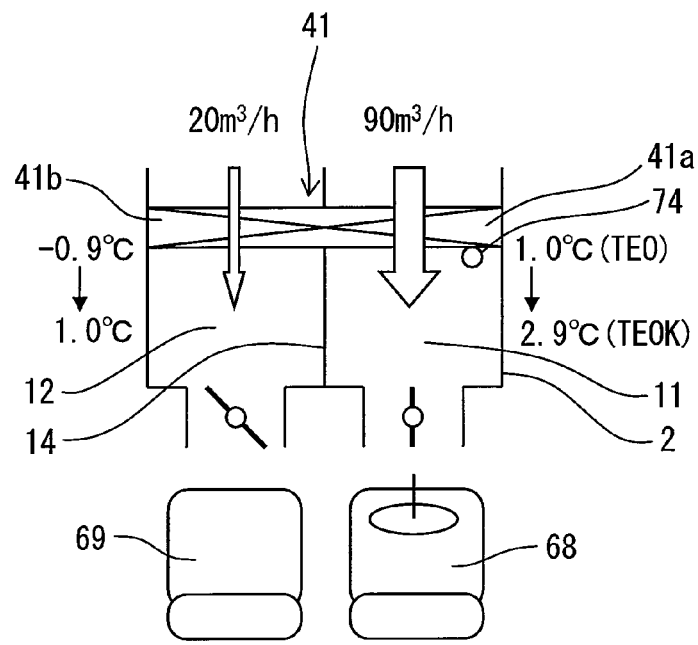

FIG. 9 (a) NORMAL AIR CONDITIONING
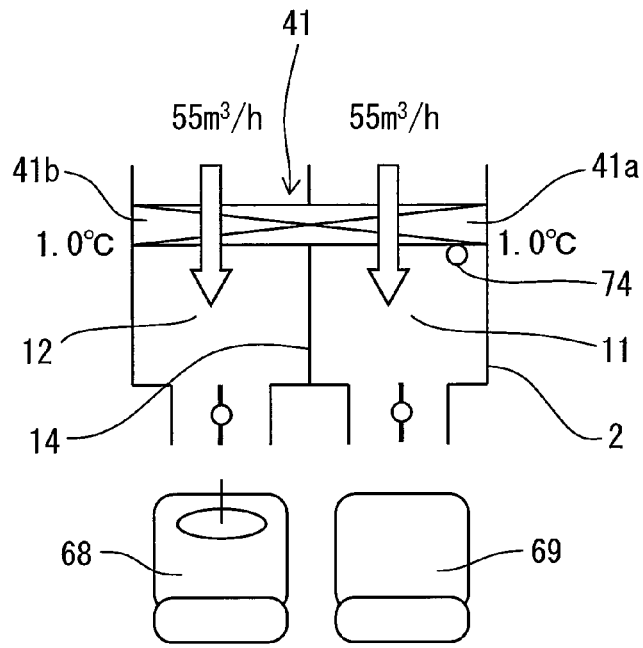
(b) INTENSIVE AIR CONDITIONING
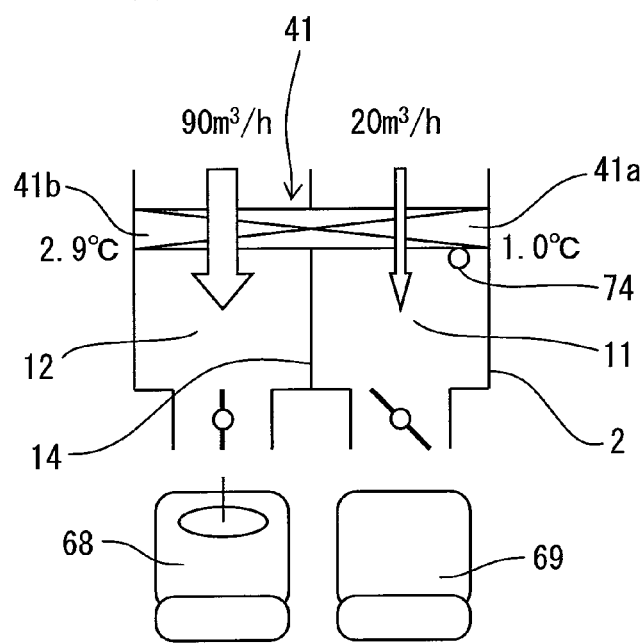

AIR CONDITIONER FOR VEHICLE

CROSS REFERENCE TO RELATED APPLICATION APPLICATIONS

This application is a U.S. National Phase Application under 35 U.S.C. 371 of International Application No. PCT/JP2012/007992 filed on Dec. 14, 2012 and published in Japanese as WO/2013/088727 A1 on Jun. 20, 2013. This application is based on Japanese Patent Applications No. 2011-274953 filed on Dec. 15, 2011. The disclosures of all of the above applications are incorporated herein by reference.

FIELD OF THE INVENTION

The present disclosure relates to an air conditioner for a vehicle, in which air is cooled at a cooling heat exchanger and blown into a passenger compartment of the vehicle.

BACKGROUND OF THE INVENTION

Conventionally, Patent Document 1 discloses an air conditioner for a vehicle. In the air conditioner for a vehicle, conditioned air, of which temperature is controlled at an evaporator, a heater core, or the like arranged in an air-conditioning duct, is blown from a driver-seat-side air outlet and a passenger-seat-side air outlet next to the driver seat side to a passenger compartment of the vehicle. When only a driver is in the passenger compartment, the passenger-seat-side air outlet is closed so as to perform air conditioning operation around the driver seat intensively.

PRIOR ART DOCUMENT

Patent Document

Patent Document 1: Japanese Unexamined Patent Publication No. 2009-292293

SUMMARY OF THE INVENTION

However, according to investigations of inventors of the present application, a flow-speed distribution of air flowing through the evaporator may easily become un-uniform when the passenger-seat-side air outlet is closed so as to perform the air conditioning operation intensively around the driver seat. For example, in a normal air-conditioning operation, air flowing through mainly a driver-seat-side part of the evaporator is guided to flow toward the driver-seat-side air outlet, and air flowing through mainly a passenger-seat-side part of the evaporator is guided to flow toward the passenger-seat-side air outlet. Further, in an intensive air-conditioning operation for the driver seat side, a flow speed of air flowing through the passenger-seat-side part of the evaporator decreases. Accordingly, in the intensive air-conditioning operation for the driver seat, temperature of the air flowing through the passenger-seat-side part of the evaporator tends to be lower than temperature of the air flowing through the driver-seat-side part of the evaporator.

Therefore, a thermistor is disposed to the driver-seat-side part of the evaporator to detect a cooling temperature of the evaporator performed as a cooling heat exchanger. However, there is a fear that the passenger-seat-side part of the evaporator may be frosted easily when a refrigerant circulation of a refrigerating cycle including the evaporator is controlled based on a detected temperature detected by the thermistor.

The present disclosure has been made in view of the foregoing matters, and it is an object to provide an air conditioner for a vehicle, in which a cooling heat exchanger can be restricted from being frosted even when a flow-speed distribution of air flowing through the cooling heat exchanger is un-uniform.

According to a first aspect of the present disclosure, an air conditioner for a vehicle includes an air-conditioning duct in which air to be blown into a passenger compartment of the vehicle flows, a cooling heat exchanger disposed in the air-conditioning duct and cooling the air, a temperature detector detecting a temperature of the air cooled at the cooling heat exchanger, and a controller setting a target cooling temperature of the air cooled at the cooling heat exchanger and controlling a cooling capacity of the cooling heat exchanger to control a detected temperature detected by the temperature detector to be the target cooling temperature. The controller selects a ventilation state between (i) a first ventilation state in which a flow speed of the air flowing through a first ventilation part of the cooling heat exchanger is substantially the same as a flow speed of the air flowing through a second ventilation part of the cooing heat exchanger and (ii) a second ventilation state in which the flow speed of the air flowing through the first ventilation part is faster than the flow speed of the air flowing through the second ventilation part. The temperature detector detects a temperature of the air cooled at the first ventilation part. The controller determines the target cooling temperature based on a target blowing temperature of the air to be blown into the passenger compartment and controls the cooling capacity of the cooling heat exchanger such that the detected temperature approaches the target cooling temperature, in the first ventilation state. The controller sets a correct target evaporator temperature to be higher by a predetermined temperature than the target cooling temperature determined based on the target blowing temperature of the air to be blown into the passenger compartment, and controls the cooling capacity of the cooling heat exchanger such that the detected temperature approaches the correct target evaporator temperature, in the second ventilation state.

Accordingly, in the second ventilation state, even if the temperature detector detects temperature of air cooled at the first ventilation part of the cooling heat exchanger, the controller (i) sets the correct target evaporator temperature, which is higher than the target cooling temperature determined based on the target blowing temperature of air to be blown into the passenger vehicle, and (ii) controls the cooling capacity of the cooling heat exchanger such that the detected temperature approaches the correct target evaporator temperature.

That is, when the flow speed of air flowing through the first ventilation part of the cooling heat exchanger is faster than the flow speed of air flowing through the second ventilation part, the controller controls the cooling capacity of the cooling heat exchanger without using the target cooling temperature detected based on the target blowing temperature of air to be blown into the passenger compartment and by using the correct target evaporator temperature which is a predetermined value higher than the target cooling temperature.

Therefore, even if the temperature detector detects temperature of air cooled at the first ventilation part of the cooling heat exchanger, the second ventilation part, which tends to be lower in temperature than the first ventilation part of the cooling heat exchanger, can be restricted from being frosted because the cooling capacity of the cooling heat exchanger is controlled so that the detected temperature detected by the temperature detector approaches the correct target evaporator temperature.

Alternatively, according to a second aspect of the present disclosure, the air conditioner for a vehicle may further have a first air outlet and a second air outlet. The first air outlet is provided in the air-conditioning duct such that air flowing through the first ventilation part is blown toward a specific seat in the passenger compartment through the first air outlet. The second air outlet is provided in the air-conditioning duct such that air flowing through the second ventilation part is blown toward a seat except for the specific seat in the passenger compartment through the second air outlet. The second ventilation state is set when the controller controls a flow rate of air blowing from the second air outlet to be smaller than a flow rate of air blowing from the first air outlet.

Accordingly, although the flow speed of air flowing through the first ventilation part is faster than the flow speed of air flowing through the second ventilation part, the second ventilation part can be restricted from being frosted, when a space including the specific seat is air-conditioned intensively by air blowing from the first flowing outlet.

Alternatively, according to a third aspect of the present disclosure, the air conditioner for a vehicle may further have a switching device opening or closing the second air outlet. The controller controls the switching device to close the second air outlet, or to decrease an opening degree of the second air outlet in the second ventilation state with respect to the first ventilation state.

Accordingly, the flow rate of air blowing from the second air outlet can easily be smaller than the flow rate of air blowing from the first air outlet by closing the second air outlet or decreasing the opening degree of the second air outlet, by using the switching device.

Alternatively, according to a fourth aspect of the present disclosure, the air conditioner for a vehicle may further have a blowing device which blows the air to the air-conditioning duct. The controller controls the flow rate of air such that air blowing from the blowing device to the second ventilation part to be smaller than the flow rate of air blowing from the blowing device to the first ventilation part in the second ventilation state, with respect to the first ventilation state.

Accordingly, the flow rate of air blowing from the second air outlet can easily be smaller than the flow rate of air blowing from the first air outlet, by controlling the flow rate of air flowing from the blowing device to the second ventilation part to be smaller than the flow rate of air flowing from the blowing device to the first ventilation part.

The specific seat may be the driver seat. In such a case, when a driver-seat-side area in the passenger compartment is air-conditioned intensively by air blowing from the first air outlet, the second ventilation part can easily be restricted from being frosted even when the flow speed of air flowing through the first ventilation part is faster than the flow speed of air flowing through the second ventilation part.

BRIEF DESCRIPTION OF THE DRAWINGS

FIG. 7 is a diagram showing examples of correction values of a target evaporator temperature;

FIGS. 8(a) and 8(b) are schematic diagrams illustrating examples of an operation of an air conditioning unit mounted in a right-hand-drive vehicle; and FIGS. 9(a) and 9(b) are schematic diagrams illustrating examples of an operation of the air conditioning unit mounted to a left-hand-drive vehicle.

DETAILED DESCRIPTION OF THE PREFERRED EMBODIMENTS

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
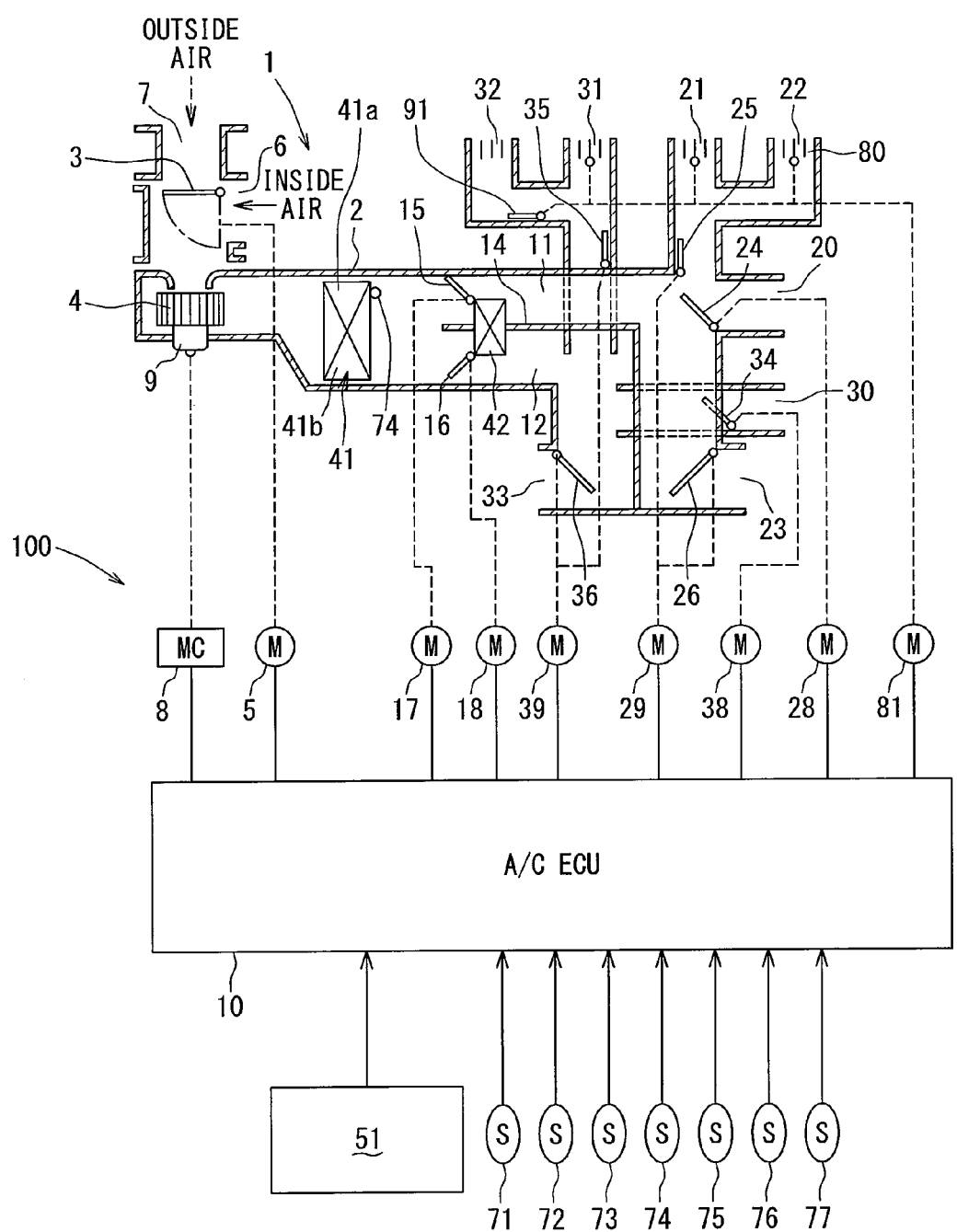
FIG. 1 is a schematic diagram showing a configuration of an air conditioner for a vehicle according to an embodiment of the present disclosure.
Figure 2:
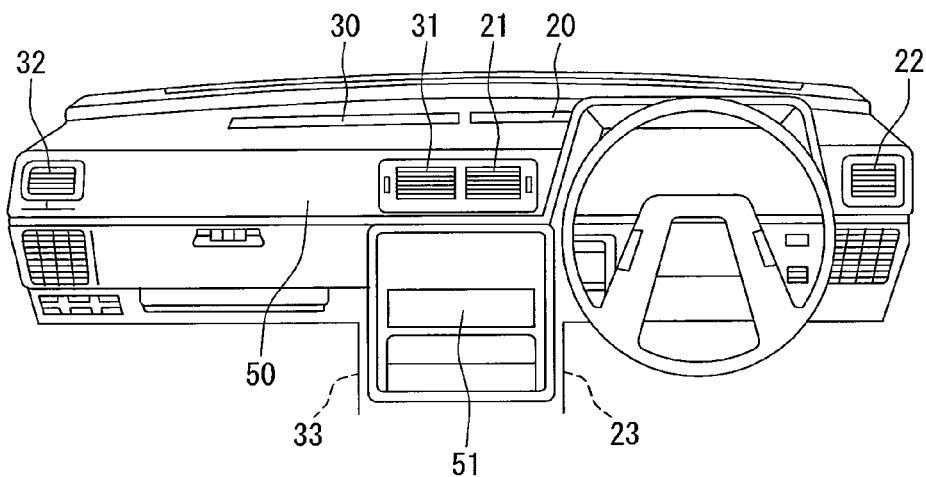
FIG. 2 is a front view of an instrument panel showing locations of air outlets.
Figure 3:
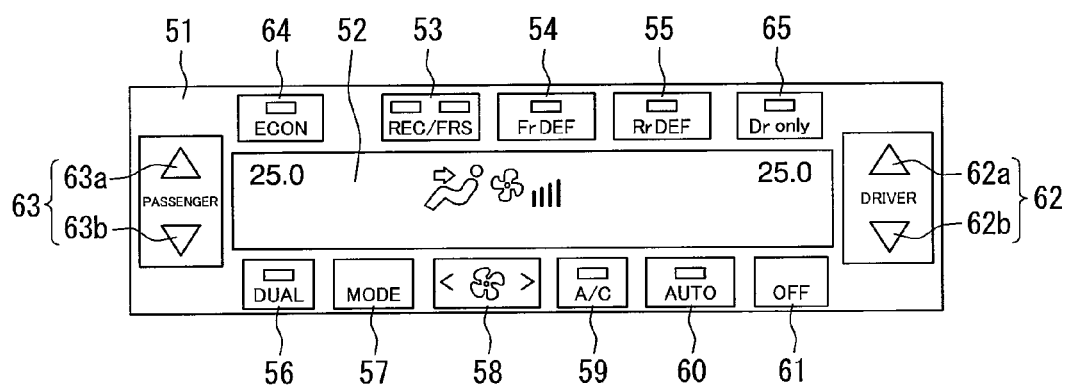
FIG. 3 is a front view of an air conditioning control panel according to the embodiment.

A first embodiment of the present disclosure will be described below referring to FIGS. 1-9. FIG. 1 is a schematic diagram illustrating a configuration of an air conditioner 100 for a vehicle of the first embodiment. FIG. 2 is a front view of an instrument panel 50 to which the air conditioner 100 is disposed and shows locations of air outlets for front seats. FIG. 3 is a front view of an air-conditioning operating panel 51.

The air conditioner 100 is an automatic air conditioning system for a vehicle, for example, a vehicle mounting a water-cooled engine for driving. In the air conditioner 100, an air conditioning unit 1 performing air conditioning operation in a passenger compartment of the vehicle is controlled by an air-conditioning electrical control unit (i.e., an air-conditioning ECU) 10.

The air conditioning unit 1 is a left/right independent type air conditioning unit capable of (i) independently regulating temperature of a driver-seat-side area to be air conditioned and temperature of a passenger-seat-side area to be air conditioned and (ii) setting various air outlet modes. The driver-seat-side area to be air conditioned includes, for example, a driver seat and a rear seat behind the driver seat. The passenger-seat-side area to be air conditioned includes, for example, a passenger seat next to the driver seat and a rear seat behind the passenger seat.

The air conditioning unit 1 has an air-conditioning duct 2 arranged at a front side within the passenger compartment of the vehicle. A blower unit is disposed upstream of the air-conditioning duct 2. The blower unit includes a blower 4 and a switching door 3, which switches inside air or/and outside air to be taken into the blower unit. The switching door 3 is an inlet switching device operated by an actuator such as a servo motor 5 to change an opening degree of an inside air inlet 6 and an opening degree of an outside air inlet 7.

The air conditioning unit 1 is a type of an air conditioner called an absolute-center-located type air conditioner and is disposed at a center area of the vehicle in a vehicle left-right direction and at downward of a dashboard located at the front side of the passenger compartment. The air conditioning unit 1 is not limited to such a type and other types such as a semi-center-located type or the like may be adaptable.

In the absolute-center-located type air conditioning unit, the blower unit is arranged forward of the air conditioning unit 1 in the driving direction. The inside air inlet 6 of the blower unit is open downward of a driver seat side and takes inside air in the passenger compartment into the blower unit from the driver seat side. Therefore, the inside air inlet 6 is open directly downward of the driver seat side so as to take inside air into the blower unit not from other parts such as a clearance provided in the instrument panel 50. When inside air is taken into the blower unit from the clearance of the instrument panel 50 or the like, the inside air taken into the blower unit may be influenced by heat of the instrument panel 50. According to the present embodiment, the inside air inlet 6 is open directly downward of the driver seat side as described above. Therefore, the inside air taken into the blower unit is not influenced by heat of the instrument panel 50.

The blower 4 is a centrifugal type blower driven and rotatable by a blower motor 9 controlled via a blower actuating circuit 8, and generates airflow in the air-conditioning duct 2. The airflow generated by the blower 4 blows into the passenger compartment. The blower 4 functions as a flow-rate setting device setting a flow rate of conditioned air to be blown (i) from driver-seat-side air outlets 20 to 23 provided at the driver seat side to the driver-seat-side area and (ii) from passenger-seat-side air outlets 30 to 33 provided at the passenger seat side to the passenger-seat-side area, respectively. The driver-seat-side air outlets 20 to 23 and the passenger-seat-side air outlets 30 to 33 will be described after. Alternatively, the blower 4 functions as a flow-speed setting device setting a flow speed of the conditioned air. The blower 4 and the blower motor 9 configure a blowing device of the present embodiment.

In the air-conditioning duct 2, an evaporator (i.e., a cooling heat exchanger) 41 cooling air flowing through the air-conditioning duct 2 is disposed. At a downstream side of the evaporator 41 in a flow direction of air, a heater core (i.e., a heating heat exchanger) 42 is disposed. At the heater core 42, air flowing through a first air passage 11 and a second air passage 12 exchanges heat with coolant for cooling engine.

The first air passage 11 and the second air passage 12 are partitioned from each other by a partition plate 14. A driver-seat-side air mix door (i.e., a driver-seat-side A/M door) 15 and a passenger-seat-side air mix door (i.e., a passenger-seat-side A/M door) 16 are disposed upstream of the heater core in the flow direction of air and regulate temperature at the driver-seat-side area and the temperature at the passenger-seat-side area, independently.

The driver-seat-side A/M door 15 and the passenger-seat-side A/M door 16 are operated by actuators such as a servo motor 17 and a servo motor 18, respectively. The driver-seat-side A/M door 15 sets temperature of conditioned air to be blown from the driver-seat-side air outlets 20 to 23 into the driver-seat-side area. The passenger-seat-side A/M door 16 sets temperature of conditioned air to be blown from the passenger-seat-side air outlets 30 to 33 into the passenger-seat-side area.

The evaporator 41 is one of devices configuring a refrigerating cycle (not shown). The refrigerating cycle includes a compressor, a condenser, a receiver, an expansion valve, and the evaporator 41. The compressor is belt driven by an output shaft of an engine for driving the vehicle to compress and discharge refrigerant. The engine is disposed in an engine compartment of the vehicle. The condenser condenses and liquefies refrigerant discharged from the compressor. The receiver separates liquid-phase refrigerant flowing from the condenser into vapor-phase refrigerant and liquid-phase refrigerant. The expansion valve expansions the liquid-phase refrigerant flowing from the receiver in a thermal insulating condition. The evaporator 41 evaporates and vaporizes vapor-liquid mixed refrigerant flowing from the expansion valve. The compressor may be an electric compressor actuated by an electric motor.

The air-conditioning ECU 10 outputs control current and changes discharge capacity of the compressor included the refrigerating cycle. According to the present embodiment, the compressor is a variable capacity compressor having an electromagnetic variable-capacity control valve performing a variable capacity control. The variable capacity control is operated based on a comparison result determined by comparing a detected temperature (i.e., an evaporator surface temperature) TE of the evaporator 41 detected by a temperature sensor (i.e., an evaporator temperature sensor) 74 and a target temperature (i.e., a target evaporator temperature) TEO. The evaporator temperature sensor 74 is, specifically, a fin temperature sensor attached to an outer fin of a heat exchanging part of the evaporator 41.

The evaporator temperature sensor 74 is a temperature detector detecting a temperature of air cooled at the evaporator 41. The target evaporator temperature TEO corresponds to a target cooling temperature of air cooled at the evaporator 41. The temperature detector is not limited to the evaporator temperature sensor 74 and may detect temperature of air flowing out of the evaporator 41.

As shown in FIGS. 1 and 2, at downstream of the first air passage 11 in the flow direction of air, a driver-seat-side defroster air outlet 20, a driver-seat-side center-face air outlet 21, a driver-seat-side side-face air outlet 22, and a driver-seat-side foot air outlet 23 are communicated with each other via each of outlet ducts. As shown in FIGS. 1 and 2, at downstream of the second air passage 12 in the flow direction of air, a passenger-seat-side defroster air outlet 30, a passenger-seat-side center-face air outlet 31, a passenger-seat-side side-face air outlet 32, and a passenger-seat-side foot air outlet 33 are communicated with each other via each of outlet ducts.

The driver-seat-side defroster air outlet 20 and the passenger-seat-side defroster air outlet 30 configure an air outlet through which conditioned air is blown toward a windshield of the vehicle located at the front side of the passenger compartment. The driver-seat-side center-face air outlet 21, the driver-seat-side side-face air outlet 22, the passenger-seat-side center-face air outlet 31, and the passenger-seat-side side-face air outlet 32 configure an air outlet through which conditioned air is blown toward an upper body of a driver and an upper body of a passenger. The driver-seat-side foot air outlet 23 and the passenger-seat-side foot air outlet 33 configure an air outlet through which conditioned air is blown toward the foot area of the driver and the passenger.

In the first air passage 11, a driver-seat-side defroster door 24, a driver-seat-side face door 25, and a driver-seat-side foot door 26 are disposed as driver-seat-side outlet switching doors. In the second air passage 12, a passenger-seat-side defroster door 34, a passenger-seat-side face door 35, and a passenger-seat-side foot door 36 are disposed as passenger-seat-side outlet switching doors. The driver-seat-side outlet switching doors and the passenger-seat-side outlet switching doors are provided to set various air outlet modes for the driver-seat-side area and various air outlet modes for the passenger-seat-side area, respectively and independently, in the passenger compartment.

The driver-seat-side outlet switching doors 24 to 26 and the passenger-seat-side outlet switching doors 34 to 36 are operated by servo motors 28, 29, 38, 39 to set the various air outlet modes for the driver-seat-side area and the various air outlet modes for the passenger-seat-side area, respectively. The driver-seat-side air outlets 20 to 23 correspond to first air outlets of the present embodiment, and the passenger-seat-side air outlets 30 to 33 correspond to second air outlets of the present embodiment. Further, the driver seat corresponds to a specific seat, and the passenger seat corresponds to another seat except for the specific seat. The passenger-seat-side air outlet switching doors 34 to 36 configure a switching device switching the second air outlets.

The driver-seat-side air outlet mode and the passenger-seat-side air outlet mode are, for example, a face (FACE) mode, a bi-level (B/L) mode, a foot (FOOT) mode, a foot/defroster mode, and a defroster (DEF) mode.

A louver 80 is disposed to each of the driver-seat-side center-face air outlet 21, the driver-seat-side side-face air outlet 22, the passenger-seat-side center-face air outlet 31, and the passenger-seat-side side-face air outlet 32 to change a flow direction of conditioned air blowing into the passenger compartment. The louver 80 is a blowing-state changing device changing an air conditioning range of area air-conditioned by conditioned air blown through each of the air outlets 21, 22, 31, and 32 into the passenger compartment.

The louver 80, which is disposed in each of the driver-seat-side center-face air outlet 21, the driver-seat-side side-face air outlet 22, and the passenger-seat-side center-face air outlet 31 capable of air-conditioning operation around the driver seat, is operated by an actuator such as a servo motor 81 and changes the flow direction of conditioned air blowing toward the driver seat side and the flow direction of conditioned air blowing toward the passenger seat side. The louver 80 disposed in the passenger-seat-side side-face air outlet 32 capable of air-conditioning operation just around the passenger seat is configured so that the flow direction of conditioned air is changeable manually by an occupant. The louver 80 is not limited to be operated by the actuator, and the louver 80 may be operated manually.

A switching door 91 is disposed in the outlet duct connected to the passenger-seat-side side-face air outlet 32 so as to (i) open the outlet duct so that conditioned air flows out of the passenger-seat-side side-face air outlet 32 or (ii) close the outlet duct so that conditioned air is restricted from flowing out of the passenger-seat-side side-face air outlet 32. The switching door 91 is operated by the actuator such as the servo motor 81. According to the present embodiment, the switching door 91 is operated by the servo motor 81 operating the louver 80. The switching device switching the second air outlets further includes the switching door 91.

An upstream end of the partition plate 14, which partitions the first air passage 11 and the second air passage 12 from each other, is located between the evaporator 41 and the heater core 42 in the flow direction of air. Accordingly, air flowing through a first ventilating part 41a, specifically, a heat exchanging part (i.e., a core part), of the evaporator 41 on the driver seat side (i.e., a side facing to an upstream-side opening of the first air passage 11), flows into mainly the first air passage 11. Further, air flowing through a second ventilating part 41b of the evaporator 41 on the passenger seat side (i.e., a side facing to an upstream-side opening of the second air passage 12) flows into mainly the second air passage 12.

The evaporator temperature sensor 74 is attached to the first ventilating part 41a of the evaporator 41 and detects temperature of air cooled at the first ventilating part 41a. The upstream end of the partition plate 14 is not limited to be located downstream of the evaporator 41 in the flow direction of air and may be located upstream of the evaporator 41 in the flow direction of air.

A control of the air conditioner 100 for the vehicle will be described. When an ignition switch starting or stopping the engine is on, a battery (not shown), which is an in-vehicle power source mounted in the vehicle, supplies an electric force to the air-conditioning ECU 10, and an arithmetic processing and a control processing are started. The air-conditioning ECU 10 corresponds to a controller of the present embodiment.

As shown in FIGS. 1 and 2, the air-conditioning ECU 10 receives switching signals from various operation switches located on an air-conditioning operating panel 51 disposed to the instrument panel 50 integrally with each other.

As shown in FIG. 3, the air-conditioning operating panel 51 is provided with, for example, a liquid crystal display 52, an inside-air/outside-air selecting switch 53, a front defroster switch 54, a rear defroster switch 55, a dual switch 56, an air-outlet-mode selecting switch 57, a blower flow-rate selecting switch 58, an air-conditioning switch 59, an auto switch 60, an off switch 61, a driver-seat-side temperature adjustor 62, a passenger-seat-side temperature adjustor 63, a fuel economy switch 64, and an economic mode switch 65 for a single occupant.

The liquid crystal display 52 is provided with, for example, a set temperature display part displaying a set temperature for the driver seat side and the passenger seat side visibly, an air-outlet-mode display part displaying an air outlet mode visibly, and a flow rate display part displaying a blower flow rate visibly. Alternatively, the liquid crystal display 52 may be provided with an outside temperature display part, an intake mode display part, a time display part, or the like. Further, various operation switches on the air-conditioning operating panel 51 may be provided to the liquid crystal display 52.

The front defroster switch 54 corresponds to an air-conditioning switch commanding whether a defogging ability for defogging the windshield increases. That is, the front defroster switch 54 is a defroster-mode requiring part requiring to switch the air outlet mode to the defroster mode. The dual switch 56 is a left/right independent control commander commanding a left/right temperature independent control for adjusting temperature in the driver-seat-side area and temperature in the passenger-seat-side area, independently. The mode selecting switch 57 is a requiring part requiring to switch the air outlet mode to one of the face mode, the bi-level (B/L) mode, the foot mode, and the foot/defroster mode, based on a manual operation operated by the occupant. The air-conditioning switch is an air-conditioning operating switch commanding to actuate or stop operation of the compressor in the refrigerating cycle. The air-conditioning switch is disposed so as to increase fuel efficiency by stopping the compressor and reducing a rotational load of the engine.

The driver-seat-side temperature adjustor 62 and the passenger-seat-side temperature adjustor 63 are a driver-seat-side temperature setting part and a passenger-seat-side temperature setting part, respectively, setting (i.e., Tset) a requested temperature for each of the driver-seat-side area and the passenger-seat-side area. The driver-seat-side temperature adjustor 62 has an up switch 62a and a down switch 62b, and the passenger-seat-side temperature adjustor 63 has an up switch 63a and a down switch 63b.

The fuel economy switch 64 is an economy switch commanding whether an air conditioning control with high mileage and saving power, which is operated by decreasing availability of the compressor of the refrigerating cycle, is required or not. The economic mode switch 65 for a single occupant is an input part requiring a setting of an intake-air-outlet mode to an economic mode for a single occupant based on a manual operation operated by the passenger.

The air-conditioning ECU 10 is provided with a well-known microcomputer including functions such as a central processing unit (i.e., a CPU) operating an arithmetic processing and a control processing, a memory such as ROM and RAM, and an input/output port (i.e., I/O circuit). Sensor signals from various sensors are input to the microcomputer after an analog to digital (A/D) convert, which is operated by the I/O port or an A/D converting circuit.

The air-conditioning ECU 10 is connected with an inside temperature sensor 71, an outside temperature sensor 72, and an insolation sensor 73. The inside temperature sensor 71 is an inside-air temperature detector detecting a temperature (i.e., an inside air temperature) Tr of air inside the passenger compartment. The outside temperature sensor 72 is an outside-air temperature detector detecting a temperature (i.e., an outside air temperature) of air outside the passenger compartment. The insolation sensor 73 is a solar radiation detector. The air-conditioning ECU 10 is connected with the evaporator temperature sensor 74, a coolant temperature sensor 75, a humidity sensor 76, and a seating sensor 77. The evaporator temperature sensor 74 is an evaporator temperature detector detecting a temperature of a surface of the evaporator 41 at an air flow side. In other words, the evaporator temperature sensor 74 detects a temperature (i.e., an evaporator temperature TE) of air after flowing through the evaporator 41. The coolant temperature sensor 75 is a heating temperature detector detecting a temperature of coolant for cooling the engine of the vehicle. The temperature of coolant is set at a target temperature of air to be heated and blown into the passenger compartment. The humidity sensor 76 is a humidity detector detecting a relative humidity in the passenger compartment. The seating sensor 77 is an occupant detector which detects an occupant seating state of various seats in the passenger compartment.

A thermo sensitive device such as a thermistor is used for the inside temperature sensor 71, the outside temperature sensor 72, the evaporator temperature sensor 74, and the coolant temperature sensor 75. The insolation sensor 73 has a driver-seat-side insolation-intensity detector and a passenger-seat-side insolation-intensity detector, and a photodiode or the like is used for the insolation sensor 73. The driver-seat-side insolation-intensity detector detects a flux of insolation (i.e., an intensity of insolation) radiated to the driver-seat-side area. The passenger-seat-side insolation-intensity detector detects a flux of insolation (i.e., an intensity of insolation) radiated to the passenger-seat-side area. The humidity sensor 76 and the inside temperature sensor 71 are housed in a recess part provided on a frontward surface of the instrument panel 50 near the driver seat. The humidity sensor 76 is used for determining whether a defroster air outlet mode is required for preventing fogging of the windshield.

Figure 4:
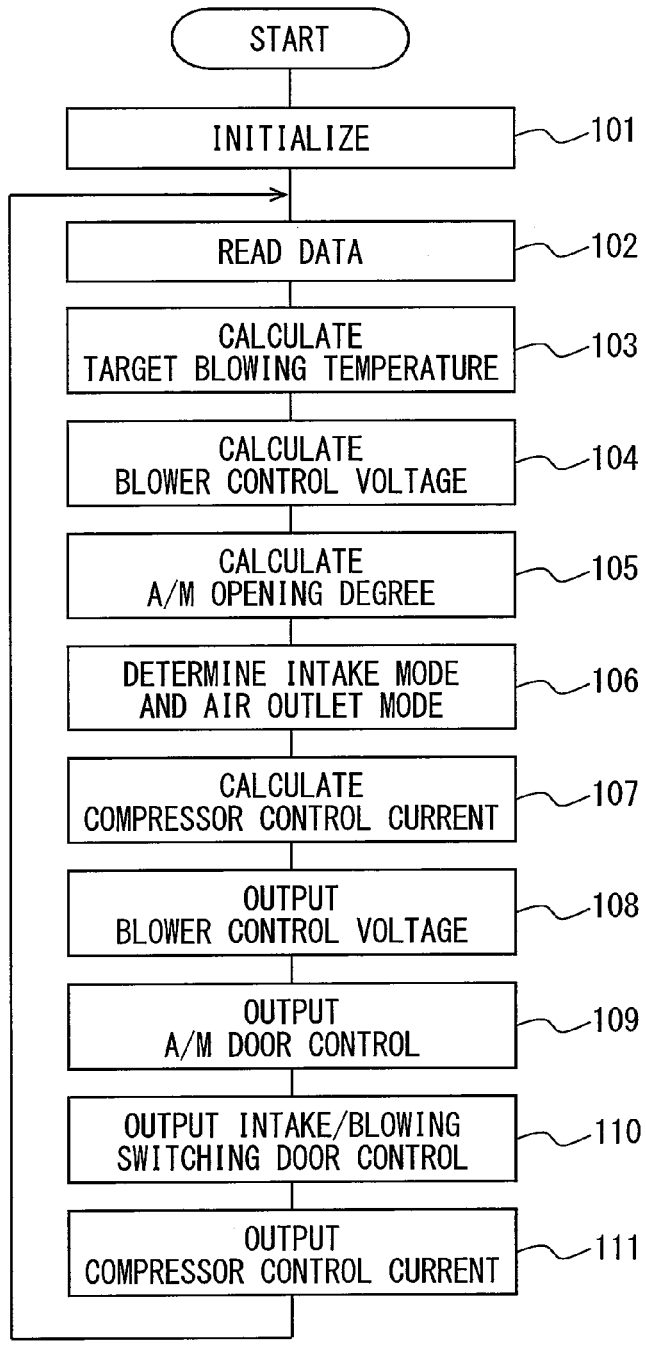
FIG. 4 is a flow chart showing an example of a schematic control program of an air-conditioning electrical control unit (i.e., an air-conditioning ECU)

A control method of the air-conditioning ECU 10 will be described referring to FIG. 4. FIG. 4 is a flow chart showing an example of a schematic control program of the air-conditioning ECU 10. When the ignition switch is on, and an electric power is supplied to the air-conditioning ECU 10, a control program of FIG. 4 memorized in the memory in advance is performed.

At step 101, stored contents or the like, which are stored into the memory for data processing included in the microcomputer in the air-conditioning ECU 10, are initialized, and the control program advances to step 102. At step 102, various data are memorized in the memory for the data processing, and the control program advances to step 103. Accordingly, at step 102, switching signals, which are from various operation switches arranged on the air-conditioning operating panel 51, and sensor signals from various sensors are input.

The sensor signals are, for example, an inside air temperature Tr in the passenger compartment detected by the inside temperature sensor 71, an outside air temperature Tam detected by the outside temperature sensor 72, an insolation amount Ts detected by the insolation sensor 73, an evaporator temperature Te detected by the evaporator temperature sensor 74, and a coolant temperature Tw detected by the coolant temperature sensor 75.

At step 103, a driver-seat-side target blowing temperature TAO (Dr) and a passenger-seat-side target blowing temperature TAO (Pa) are calculated by assigning an input data to a memorized arithmetic expression. Subsequently, a target evaporator temperature TEO is calculated from the driver-seat-side target blowing temperature TAO (Dr), the passenger-seat-side target blowing temperature TAO (Pa), and the outside air temperature Tam, and the control program advances to step 104. At step 104, an air blowing amount, in other words, a blower control voltage VA to be applied to the blower motor 9, is calculated based on the calculated driver-seat-side target blowing temperature TAO (Dr) and the calculated passenger-seat-side target blowing temperature TAO (Pa), and the control program advances to step 104.

The blower control voltage VA is calculated by averaging a blower control voltage VA (Dr) applicable to the driver-seat-side target blowing temperature TAO (Dr) and a blower control voltage VA (Pa) applicable to the passenger-seat-side target blowing temperature TAO (Pa), which are calculated based on a predetermined characteristic pattern.

At step 105, an opening degree SW (Dr) (%) of the driver-seat-side A/M door 15 and an opening degree SW (Pa) (%) of the passenger-seat-side A/M door 16 are calculated by assigning the calculated driver-seat-side target blowing temperature TAO (Dr), the calculated passenger-seat-side target blowing temperature TAO (Pa), and the data being input at step 102 to an arithmetic expression. Subsequently, the control program advances to step 106. At step 106, an intake mode for introducing air into the air conditioning unit 1 and an air outlet mode for blowing air into the passenger compartment are determined based on the calculated driver-seat-side target blowing temperature TAO (Dr) and the calculated passenger-seat-side target blowing temperature TAO (Pa) calculated at step 103. Subsequently, the control program advances to step 107.

At step 107, a control current for controlling the compressor to have a target discharging capacity is determined by a feedback control (i.e., a PI control) so that the calculated target evaporator temperature TEO and the actual evaporator temperature TE detected by the evaporator temperature sensor 74, which are calculated at step 103, coincide with each other. Subsequently, the control program advances to step 108. Specifically, for example, a solenoid current (i.e., a control current: In) is calculated based on an arithmetic expression memorized in the memory to approach a target value of a control current applied to an electromagnetic solenoid of the electromagnetic variable-capacity control valve attached to the compressor.

When the compressor is an electric compressor, for example, a control value of a rotation speed of the compressor is determined at step 107.

At step 108, a control signal is output for the blower actuating circuit 8 so that the blower control current VA calculated at step 104 is applied to the blower motor 9, and subsequently, the control program advances to the 109. At step 109, control signals are output to the servo motors 17, 18 so that the opening degree SW (Dr) and the opening degree SW (Pa) determined at step 105 are set. Subsequently, the control program advances to step 110. At step 110, control signals are output to the servo motors 28, 29, 38, 39 so that the intake mode and the air outlet mode determined at step 106 are set. Subsequently, the control program advances to step 111.

At step 111, the solenoid current (i.e., the control current: In) determined at step 107 is output for the electromagnetic solenoid of the electromagnetic variable-capacity control valve attached to the compressor. When the compressor is an electric compressor, a rotation speed control signal of the compressor determined at step 107 is output.

A predetermined time after from an operation of step 111, the control program returns to step 102, and a process from step 102 to step 111 are repeated. By repeating the process, a temperature in the passenger compartment can approach a temperature set by an occupant.

Figure 5:
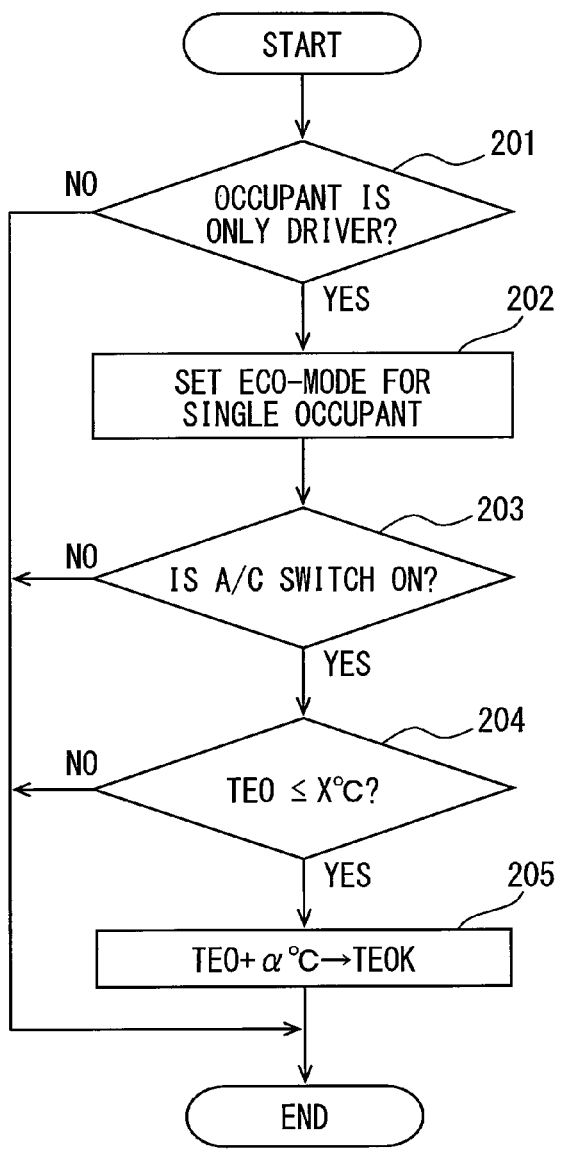
FIG. 5 is a flow chart showing an example of the schematic control program of the air-conditioning ECU in an economic mode for a single occupant.

An example of an operation for the economic mode for a single occupant performed by the air-conditioning ECU 10 will be described referring to FIG. 5. FIG. 5 is a flow chart showing an example of a control program due to the air-conditioning ECU 10 for performing the economic mode for a single occupant. A processing shown in FIG. 5 is a sub-process arranged between step 106 and step 107 of the FIG. 4. Accordingly, the control program advances to 201 of FIG. 5 after step 106 of FIG. 4. At step 201, it is determined whether only a driver is seating, based on a signal corresponding to an occupant presence state, which is a state of occupants seating on various seats, detected by the seating sensor 77. When only the driver is detected, the control program advances to step 202. When an occupant other than the driver is further detected, the control program advances to step 107 of FIG. 4 and operates a normal air-conditioning operation.

At step 202, since only the driver is seating, the intake mode and the air outlet mode are set to the economic mode for a single occupant as a mode to rapidly adjust temperature in the driver-seat-side area.

Specifically, the intake mode is performed as an inside air mode, and the switching door 3, which is for switching inside air and outside air to be introduced into the blower unit, is operated to open an inside air intake port 6 located downward of the driver seat side in the intake mode. Further, both of the air outlets 30, 33 open toward only the passenger-seat-side area are closed by corresponding passenger-seat-side doors 34, 36. Orientations of the louver 80, which is disposed to the air outlets 21, 22, 31 opened toward the driver-seat-side area, is adjusted to change an area to be air-conditioned, and air conditioning operation is performed mainly around the driver seat. An open/close state of the switching door 91 is switched from an open state to a closed state, and the passenger-seat-side side-face air outlet 32 is set to a closed state.

When the air conditioning mode is the cooling mode, cooled air is blown toward the driver seat by the bi-level mode in which the face air outlets 21, 22, 31 and the foot air outlet 23 are open by the driver-seat-side doors 24-26.

When the air conditioning mode is the heating mode, warmed air is blown toward the driver seat in the foot mode in which only the foot air outlet 23 is open, or the foot air outlet 23 is widely open and the defroster air outlet 20 is slightly open by the driver-seat-side doors 24-26. Alternatively, the air outlet mode in the heating may be the bi-level mode as the air outlet mode in the cooling. Accordingly, because conditioned air is blown only toward the driver-seat-side area, the driver-seat-side area can be air-conditioned effectively and promptly to approach the predetermined temperature.

When it is determined that only the driver is seating in the passenger compartment based on a detection result of the seating sensor 77, the air outlet mode promptly regulating temperature in the driver seat side can be set. Specifically, the air outlets 30, 32, 33 of the air outlets 20-23 and 30-33, which are open not toward the driver-seat-side area, are closed by corresponding outlet doors 34, 36, 91, respectively. Therefore, an air-conditioned area of the air outlets 21, 22, 31 is set to the driver-seat-side area. Further, in this case, the intake mode is set to the inside air mode. Because conditioned air is blown toward only the driver-seat-side area, a temperature in the driver-seat-side area can approach to the predetermined temperature effectively. Moreover, because only the driver-seat-side area is air-conditioned, power for air conditioning operation can be reduced.

When an intensive air-conditioning operation in which only the driver-seat-side area is air-conditioned is performed, the passenger-seat-side face door 35 may close the passenger-seat-side center-face air outlet 31. When the intensive air-conditioning operation is performed in the heating mode, the passenger-seat-side defroster air outlet 30 may be slightly open so as to restrict the passenger-seat-side windshield from getting fogging. Further, when the intensive air-conditioning operation is performed in the heating mode by displacing the outlet switching doors, the passenger-seat-side side-face air outlet 32 is open so as to restrict the passenger-seat-side windshield from getting fogging.

When the economic mode for a single occupant is set at step 202, the control program advances to step 203. At step 203, it is determined whether the air-conditioning switch 59 is on. That is, it is determined that the compressor is on (i.e., working). When the air-conditioning switch 59 is off, the control program advances to step 107 in FIG. 4. Specifically, since the compressor is not working, the control program bypasses step 107 and advances to step 108.

When it is determined that the air-conditioning switch 59 is on at step 203, the control program advances to step 204. At step 204, it is determined whether the target evaporator temperature TEO determined at step 103 is lower than or equal to a predetermined temperature X° C. The predetermined temperature X° C. is determined based on a configuration of the air-conditioning unit and may have various values. For example, the predetermined temperature X° C. may be 2.9° C.

For example, when availability of the compressor of the refrigerating cycle is decreases by setting the fuel economy switch 64 on and by setting the target evaporator temperature TEO to exceed X° C., the determination at step 204 is NO, and the control program advances to step 107 in FIG. 4. Alternatively, for example, when the target evaporator temperature TEO is set to be generally high temperature in a state where outside air temperature is intermediate level, not generally high or generally low, the compressor automatically performs in a power saving operation. In such a case, the determination at step 204 is NO, and the control program advances to step 107 in FIG. 4.

When it is determined that the target evaporator temperature TEO is lower than or equal to X° C. at step 204, the control program advances to step 205. At step 205, a correct target evaporator temperature TEOK is calculated to be higher by a predetermined value α° C. (e.g., 1.9° C.) than the target evaporator temperature TEO. When step 205 is operated, the control program advances to step 107 in FIG. 4.

At step 107, a control current of the compressor is determined so that the correct target evaporator temperature TEOK coincides with the actual evaporator temperature TE detected by the evaporator sensor 74, when step 205 is performed to correct the target evaporator temperature TEO to the correct target evaporator temperature TEOK.

Figure 6:
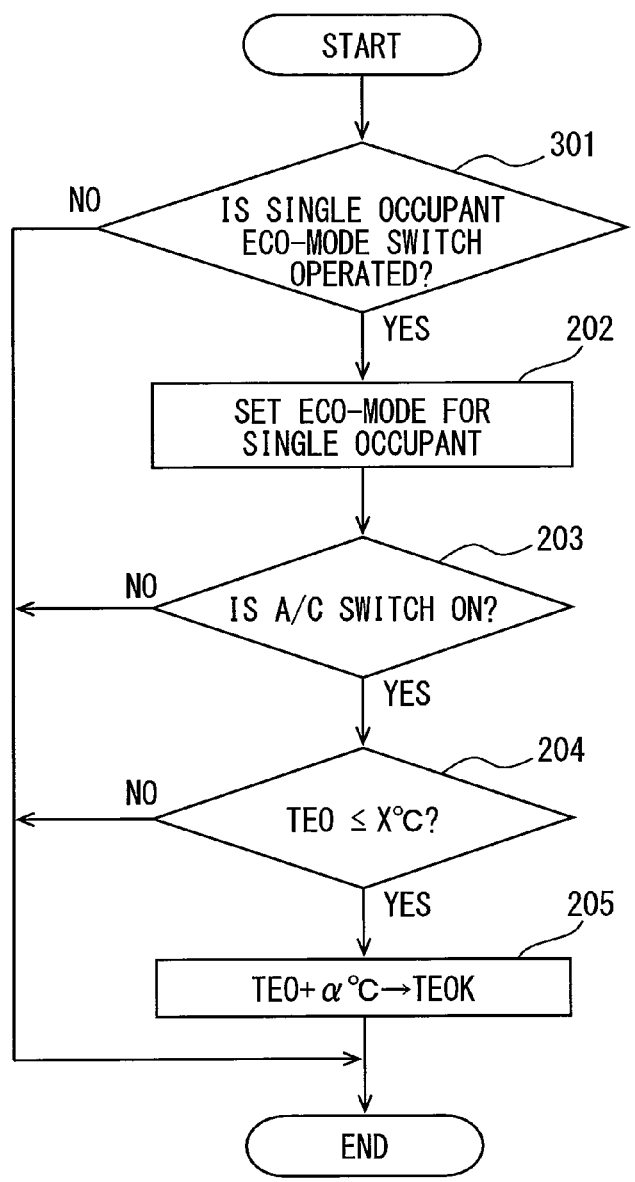
FIG. 6 is a flow chart showing another example of the schematic control program of the air-conditioning ECU in the economic mode.

An example of a control regarding to the economic mode for a single occupant operated by the air-conditioning ECU 10 will be described referring to FIG. 6. FIG. 6 is a flow chart showing the example of the control regarding to the economic mode for a single occupant operated by the air-conditioning ECU 10. A process shown in FIG. 6 is performed at the same time as the process shown in the FIG. 5 described above. The process of FIG. 6 is a sub-process performed between step 106 and step 107 of FIG. 4. That is, next step to step 106 of FIG. 4 is step 301 of FIG. 6.

At step 301, it is determined whether the economic mode switch 65, which is one of various operation switches on the air-conditioning operation panel 51, is operated by an occupant. When it is determined that the economic mode switch 65 is operated (i.e., the economic mode switch 65 is on) at step 301, the process advances to step 202, and the rest of the control is the same as the control flow after step 202 in FIG. 5.

Accordingly, when the economic mode switch 65, which is an input part inputting a command an operation of the mode performing air conditioning operation of the driver-seat-side area, is operated, the air-conditioning ECU 10 can set a mode adjusting temperature in the driver-seat-side area promptly. Therefore, the same effects of air conditioning operation in the driver-seat-side area described above referring to FIG. 5 can be achieved.

According to the configuration and the control action described above, the air-conditioning ECU 10 causes the air outlets 30, 32, 33 opened toward the passenger-seat-side area and causes the air outlets 21, 22, 31 to be open so as to blow conditioned air toward the driver seat, when air conditioning operation is performed intensively around the driver seat. In this case, air flows through the evaporator 41 in the air-conditioning duct 2 so that a flow speed of air flowing into the first air passage 11 via the first ventilating part 41a is faster than a flow speed of air flowing into the second air passage 12 via the second ventilating part 41b.

For example, as shown in FIG. 8(a), in the normal air-conditioning operation, in which air conditioning operation is operated generally by the same degree around a driver seat 68 and around a passenger seat 69, a flow speed of air flowing through the first ventilation part 41a is generally equal to a flow speed of air flowing through the second ventilation area 41b. The reason is that a flow rate of the air flowing through the first ventilation part 41a is generally equal to a flow rate of the air flowing through the second ventilation area 41b because area of the first ventilation part 41a and area of the second ventilation part 41b are generally the same in range in this example. This example of FIG. 8(a) corresponds to a first ventilation state of the present embodiment.

Whereas, as shown in FIG. 8(b), in the intensive air-conditioning operation, in which air conditioning operation is operated intensively around the driver seat 68, a flow speed of the air flowing through the first ventilation part 41a is faster than a flow speed of the air flowing through the second ventilation part 41b. The reason of causing of this state is that a flow rate of the air flowing through the first ventilation part 41a is larger than a flow rate of the air flowing through the second ventilation part 41b because area of the first ventilation part 41a and the area of the second ventilation part 41b are generally the same in this example. This example of FIG. 8(b) corresponds to a second ventilation state of the present embodiment.

The evaporator sensor 74 is disposed at the first ventilation part 41a of the evaporator 41. Accordingly, when the target evaporator temperature TEO is set to, for example, 1° C., temperature of the evaporator 41 is generally uniform when the flow speed of the air flowing through the first ventilation part 41a is equal to the flow speed of the air flowing through the second ventilation part 41b (i.e., when the ventilation state is provided), as shown in FIG. 8(a). Specifically, according to this example shown in FIG. 8(a), both of a temperature at the first ventilation part 41a and a temperature of the second ventilation part 41b approach 1° C. Therefore, the evaporator 41 does not get frosted.

Whereas, as shown in FIG. 8(b), the flow speed of the air flowing through the first ventilation part 41a is faster than the flow speed of the air flowing through the second ventilation part 41b, in other words, the second ventilation state is provided. In this case, temperature at the second ventilation part 41b of the evaporator 41, through which air flows slower than air flowing through the first ventilation part 41a, is lower than temperature at the first ventilation part 41a. Accordingly, when the target evaporator temperature TEO is set to, for example, 1° C. and when the evaporator surface temperature TE detected by the evaporator sensor 74 is controlled to coincide with the target evaporator temperature TEO, temperature at the second ventilation part 41b approaches, for example, −0.9° C. Thus, a possibility that the second ventilation part 41b gets frosted becomes higher.

According to the present embodiment, as shown in FIG. 8(b), a cooling capacity is controlled based on the correct target evaporator temperature TEOK determined by correcting the target evaporator temperature TEO when a flow-speed distribution of air flowing through the evaporator 41 is un-uniform. As a specific example, the correct target evaporator temperature TEOK is set to 2.9° C. by adding a correction value 1.9° C. to the target evaporator temperature TEO, and the evaporator surface temperature TE detected by the evaporator sensor 74 is controlled to coincide with the correct target evaporator temperature TEOK. Accordingly, temperature at the first ventilation part 41a of the evaporator 41 approaches 2.9° C., and temperature at the second ventilation part 41b of the evaporator 41 approaches 1° C. Therefore, the evaporator 41 does not get frosted.

Thus, according to the air conditioner 100 for the vehicle of the present embodiment, even when the evaporator sensor 74 is disposed at the first ventilation part 41a through which air flows faster than air flowing through the second ventilation part 41b in the intensive air-conditioning operation for the driver-seat-side area, the evaporator 41 can be restricted from being frosted.

Although an evaporator sensor may be disposed at each of the first ventilation part 41a and the second ventilation part 41b to restrict frosting, the number of components increases, and a configuration becomes complicated. According to the present embodiment, the increase of the number of components and the increase of the complex of the configuration can be restricted.

According to the air conditioner 100 for a vehicle, the air conditioning unit 1 having the same configuration may be mounted to both of a right-hand-drive vehicle and a left-hand-drive vehicle. FIGS. 9(a) and 9(b) show a case where the air conditioning unit 1 of the present embodiment is mounted in a left-hand-drive vehicle. As shown in FIGS. 9(a) and 9(b), the evaporator 41 does not get frosted both (i) in a normal air-conditioning operation in which the air conditioning operation is operated around the driver seat 68 and around the passenger seat 69 generally by the same degree and (ii) in an intensive air-conditioning operation in which the air conditioning operation is operated around the driver seat 68 intensively.

Accordingly, an air conditioning unit having the same configuration can be mounted in both of the right-hand-drive vehicle and the left-hand-drive vehicle by controlling the cooling capacity of an evaporator in the intensive air-conditioning operation in the right-hand-drive vehicle or the left-hand drive vehicle, based on the correct target evaporator temperature TEOK determined by correcting the target evaporator temperature TEO.

In FIGS. 8(a), 8(b), 9(a), and 9(b), illustration of a heater core or the like is omitted, and the driver-seat-side air outlets and the passenger-seat-side air outlets are shown as a single air outlet, respectively, to be easily understood.

According to the present embodiment described above, a predetermined value α (° C.) (e.g., 1.9° C. calculated from a temperature distribution of the evaporator in the present embodiment) of temperature as a fixed correction value is added to the target evaporator temperature TEO when step 205 shown in FIGS. 5 and 6 is performed. For example, as shown in FIG. 7, a correction value is predetermined to be able to restrict frosting based on the temperature distribution of the evaporator due to an uneven flow-speed distribution of air flowing through the evaporator, depending on outside air temperature, a space to be air-conditioned, an air outlet mode, a flow rate produced by blower, or the like.

FIG. 7 shows an example of the air conditioner capable of switching air-conditioning states between (i) a state in which the air conditioning operation is performed around all seats including front seats and rear seats in the passenger compartment, (ii) a state in which the air conditioning operation is performed only around the front seats, and (iii) a state in which the air conditioning operation is performed only around the driver seat.

Other Modifications

Although a preferable embodiment of the present disclosure is described above, the present disclosure is not limited to the above embodiment, and various modifications can be applied to the embodiment within a scope of the present disclosure.

Although the specific seat, to which air with larger flow rate is blown than to other seats in the intensive air-conditioning operation, is the driver seat according to the above embodiment, the specific seat is not limited to the driver seat. For example, the specific seat may be a rear seat of a vehicle used for a hired vehicle with a driver, a taxi, or the like. Further, when air blown toward other seats is smaller in a flow rate than air blown toward the specific seat, (i) air outlets, which correspond to the second air outlets, through which conditioned air is blown toward the other seats may be closed, and (ii) air outlets, which correspond to the first air outlets, through which conditioned air is blown toward the specific seat may be slightly open.

Further, although the flow speed of air flowing through the first ventilation part 41a of the evaporator 41 is faster than the flow speed of air flowing through the second ventilation part 41b by closing the passenger-seat-side air outlets in the intensive air-conditioning operation for the driver seat according to the above embodiment, it is just an example. For example, a flow rate of air blowing from the blowing device, which is configured by the blower 4 and the blower motor 9, to the first ventilation part 41a of the evaporator 41 may be larger than a flow rate of air blowing from the blowing device to the second ventilation part 41b.

That is, the flow speed of air flowing through the first ventilation part 41a of the evaporator 41 may be faster than the flow speed of air flowing through the second ventilation part 41b of the evaporator 41 by controlling an air passage arranged downstream of the evaporator 41. Alternatively, the flow speed of air flowing through the first ventilation part 41a may be faster than the flow speed of air flowing through the second ventilation part 41b due to an airflow distribution of air flowing from upstream of the evaporator 41 into the evaporator 41. Alternatively, the flow speed of air flowing through the first ventilation part 41a may be faster than the flow speed of air flowing through the second ventilation part 41b (i) by controlling the air passage arranged downstream of the evaporator 41 and (ii) due to the air flow distribution of air flowing from upstream of the evaporator 41 into the evaporator 41. An adaptable control program may be required just to control the target evaporator temperature TEO to be higher value when the flow speed of air flowing through the first ventilation part 41a of the evaporator 41 is faster than the flow speed of air flowing through the second ventilation part 41b of the evaporator 41.

A state, in which the flow rate of air blowing from the blowing device to the first ventilation part 41a and the flow rate of air blowing from the blowing device to the second ventilation part 41b are different from each other, can be provided by disposing multiple blowing devices and actuating each of the multiple blowing devices, respectively. Alternatively, the state can be provided by disposing a door device configured by extending the partition plate 14 to upstream of the evaporator 41 in the flow direction of air so that the door device distributes a flow rate of air to the first air passage 11 and the second air passage 12.

Although a case where the intensive air-conditioning operation is operated when there is a single occupant in the vehicle is described according to the above embodiment, it is not limited. For example, it may be an object to secure comfort for each occupant, respectively. In such a case, although the flow-speed distribution of air flowing through the evaporator 41 may be un-uniform by operating air conditioning operation with respect to each space to be air-conditioned in the passenger compartment, the present disclosure is effectively adapted.

What is claimed is:

1. An air conditioner for a vehicle, comprising:
   an air-conditioning duct in which air to be blown into a passenger compartment of the vehicle flows;
   a cooling heat exchanger disposed in the air-conditioning duct and cooling the air, the cooling heat exchanger having a first ventilation part and a second ventilation part through which the air flows;

a temperature detector detecting a temperature of the air cooled at the cooling heat exchanger;

a partition plate disposed downstream of the cooling heat exchanger in a flow direction of air and partitioning a first air passage in which the air flowing through the first ventilation part flows and a second air passage in which the air flowing through the second ventilation part flows; and a controller setting a target cooling temperature of the air cooled at the cooling heat exchanger and controlling a cooling capacity of the cooling heat exchanger to control a detected temperature detected by the temperature detector to be the target cooling temperature, wherein the air after passing through the first ventilation part flows to a driver seat through the first air passage, and the air after passing through the second ventilation part flows to a passenger seat through the second air passage, the controller is capable of selecting a ventilation state between (i) a first ventilation state in which a flow speed of the air flowing through the first ventilation part is substantially the same as a flow speed of the air flowing through the second ventilation part, (ii) a second ventilation state in which the flow speed of the air flowing through the first ventilation part is faster than the flow speed of the air flowing through the second ventilation part, and (iii) a third ventilation state in which the flow speed of the air flowing through the first ventilation part is slower than the flow speed of the air flowing through the second ventilation part, the temperature detector is disposed only at the first ventilation part and detects a temperature of the air cooled at the first ventilation part, when the air conditioner is mounted to one of a right-hand-drive vehicle and a left-hand-drive vehicle,
  (i) the controller determines the target cooling temperature based on a target blowing temperature of the air to be blown into the passenger compartment and controls the cooling capacity of the cooling heat exchanger such that the detected temperature approaches the target cooling temperature, in a normal air-conditioning operation providing the first ventilation state in which the driver seat and the passenger seat are air-conditioned generally by the same degree, and
  (ii) the controller sets a correct target evaporator temperature to be higher by a predetermined temperature than the target cooling temperature determined based on the target blowing temperature of the air to be blown into the passenger compartment and controls the cooling capacity of the cooling heat exchanger such that the detected temperature approaches the correct target evaporator temperature, in an intensive air-conditioning operation providing the second ventilation state in which the driver seat is air-conditioned intensively, and when the air conditioner is mounted to the other one of the right-hand-drive vehicle and the left-hand-drive vehicle, the controller (i) determines the target cooling temperature based on the target blowing temperature in both of the normal air-conditioning operation and the intensive air-conditioning operation and (ii) controls the cooling capacity of the cooling heat exchanger such that the detected temperature approaches the target cooling temperature.

2. The air conditioner for a vehicle according to claim 1, further comprising:

a first air outlet provided to the air-conditioning duct such that air flowing through the first ventilation part is blown toward one of the driver seat and the passenger seat in the passenger compartment through the first air outlet; and a second air outlet provided to the air-conditioning duct such that air flowing through the second ventilation part is blown toward the other one of the driver seat and the passenger seat in the passenger compartment through the second air outlet, wherein when the air conditioner is mounted to the one of the right-hand-drive vehicle and the left-hand-drive vehicle, the second ventilation state is set when the controller controls a flow rate of air blowing from the second air outlet to be smaller than a flow rate of air blowing from the first air outlet, and when the air conditioner is mounted to the other one of the right-hand-drive vehicle and the left-hand-drive vehicle, the third ventilation state is set in a case where the controller controls the flow rate of air blowing from the first air outlet to be smaller than the flow rate of air blowing from the second air outlet.

3. The air conditioner for a vehicle according to claim 2, further comprising:

a switching device opening or closing the first air outlet and the second air outlet, wherein the controller controls the switching device to close the second air outlet or to decrease an opening degree of the second air outlet in the second ventilation state, with respect to the first ventilation state, and the controller controls the switching device to close the first air outlet, or to decrease an opening degree of the first air outlet in the third ventilation state with respect to the first ventilation state.

4. The air conditioner for a vehicle according to claim 1, wherein the predetermined value used to determine the correct target evaporator temperature is determined based on an outside air temperature, an air outlet mode, and a blower flow rate.

* * * * *